(12) United States Patent
Zhamu et al.

(10) Patent No.: US 10,777,808 B2
(45) Date of Patent: Sep. 15, 2020

(54) EXFOLIATED GRAPHITE WORM-PROTECTED METAL FLUORIDE AND METAL CHLORIDE CATHODE ACTIVE MATERIALS FOR LITHIUM BATTERIES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 337 days.

(21) Appl. No.: 15/419,454

(22) Filed: Jan. 30, 2017

(65) Prior Publication Data

US 2018/0219214 A1    Aug. 2, 2018

(51) Int. Cl.

| | | |
|---|---|---|
| *H01M 4/133* | (2010.01) | |
| *H01M 4/136* | (2010.01) | |
| *H01M 4/1397* | (2010.01) | |
| *H01M 4/36* | (2006.01) | |
| *H01M 4/58* | (2010.01) | |
| *H01M 4/62* | (2006.01) | |
| *H01M 4/66* | (2006.01) | |
| *H01M 10/0525* | (2010.01) | |
| *H01M 4/02* | (2006.01) | |

(52) U.S. Cl.
CPC ........... *H01M 4/366* (2013.01); *H01M 4/133* (2013.01); *H01M 4/136* (2013.01); *H01M 4/1397* (2013.01); *H01M 4/582* (2013.01); *H01M 4/625* (2013.01); *H01M 4/663* (2013.01); *H01M 10/0525* (2013.01); *H01M 2004/028* (2013.01)

(58) Field of Classification Search
CPC .... H01M 4/133; H01M 4/136; H01M 4/1397; H01M 4/366; H01M 4/582; H01M 4/625; H01M 4/663; H01M 10/0525; H01M 2004/028

See application file for complete search history.

(56) References Cited

U.S. PATENT DOCUMENTS

| | | | |
|---|---|---|---|
| 2,798,878 | A | 7/1957 | Hummers |
| 4,584,252 | A | 4/1986 | Touzain et al. |
| 6,139,989 | A | 10/2000 | Kawakubo et al. |
| 7,071,258 | B1 | 7/2006 | Jang et al. |
| 9,666,899 | B2 | 5/2017 | He et al. |
| 2005/0271574 | A1 | 12/2005 | Jang et al. |
| 2008/0048152 | A1 | 2/2008 | Jang et al. |
| 2009/0117466 | A1 | 5/2009 | Zhamu et al. |
| 2010/0206363 | A1 | 8/2010 | Choi |
| 2011/0017585 | A1 | 1/2011 | Zhamu et al. |
| 2013/0271085 | A1* | 10/2013 | Chen .................. H01M 4/0445 320/132 |

OTHER PUBLICATIONS

Zhao et al. "Photothermal-assisted fabrication of iron fluoride-graphene composite paper cathodes for high-energy lithium-ion batteries" Chem. Commun. (2012) vol. 48, pp. 9909-9911.

Conte et al., "A review on the application of iron(III) fluorides as positive electrodes for secondary cells" Matter Renew Sustain Energy (2014) 3:37.

Kim et al., "A cathode material for lithium-ion batteries based on graphitized carbon-wrapped FeF3 nanoparticles prepared by facile polymerization" Journal of Materials Chemistry A (2016) vol. 4, pp. 14857-14864.

Li et al., "High-Capacity Lithium-Ion Battery Conversion Cathodes Based on Iron Fluoride Nanowires and Insights into the Conversion Mechanism" Nano Letters (2012) vol. 12, pp. 6030-6037.

Liu et al., "Excellent cycle performance of Co-doped FeF3/C nanocomposite cathode material for lithium-ion batteries" Journal of Materials Chemistry (2012) vol. 22, pp. 17539-17550.

Ma et al., "Large-scale fabrication of graphene-wrapped FeF3 nanocrystals as cathode materials for lithium ion batteries" Nanoscale (2013) vol. 5, pp. 6338-6343.

PCT/US18/13756 International Search Report and Written Opinion, dated Apr. 5, 2018, 13 pages.

Zhou et al., "Facile Spray Drying Route for the Three-Dimensional Graphene-Encapsulated Fe2O3 Nanoparticles for Lithium Ion Battery Anodes" Industrial & Engineering Chemistry Research (2012) vol. 52, pp. 1197-1204.

Chen et al., "Rational Design of Cathode Structure for High Rate Performance Lithium-Sulfur Batteries" Nano Letters (2015) vol. 15, pp. 5443-5448.

Chun et al., "Ammonium Fluoride Mediated Synthesis of Anhydrous Metal Fluoride-Mesoporous Carbon Nanocomposites for High-Performance Lithium Ion Battery Cathodes" ACS Applied Materials & Interfaces (2016) vol. 8, pp. 35180-35190.

Flandrois et al., "Magnetic Properties of First-Stage Nickel Chloride Graphite Intercalation Compounds" Synthetic Metals (1989) vol. 34, pp. 531-536.

PCT/US18/13760—International Search Report and Written Opinion dated May 14, 2018, 15 pages.

Yazici et al., "Flexible graphite as battery anode and current collector" Journal of Power Sources (2005) vol. 141, pp. 171-176.

F. Badway, et al., "Carbon metal fluoride nanocomposites high-capacity reversible metal fluoride conversion materials as rechargeable positive electrodes for Li batteries," J. Electrochem. Soc. 150 (2003) A1318-A1327.

(Continued)

*Primary Examiner* — Anca Eoff

(57) ABSTRACT

A lithium battery cathode layer containing multiple particles or coating of a cathode active material (metal fluoride or metal chloride) and a layer of exfoliated graphite worms composed of interconnected graphite flakes and inter-flake pores, wherein (a) the graphite worms are selected from exfoliated natural graphite, exfoliated artificial graphite, exfoliated meso carbon micro-beads, exfoliated coke, exfoliated meso-phase pitch, exfoliated carbon or graphite fiber, or a combination thereof; (b) the cathode active material particles or coating has a size from 0.4 nm to 10 µm, and is in an amount from 1% to 99% by weight based on the total weight of graphite worms and the cathode active material combined; and (c) some of the pores are lodged with particles or coating of the cathode active material.

22 Claims, 9 Drawing Sheets

(56) References Cited

OTHER PUBLICATIONS

S.W. Kim, et al., "Fabrication of FeF3 nanoflowers on CNT branches and their application to high power lithium rechargeable batteries," Adv. Mater. 22 (2010) 5260-5264.

L. Liu, et al., "Synthesis and electrochemical performance of spherical FeF3/ACMB composite as cathode material for lithium-ion batteries," J. Mater. Sci. 47 (2012) 1819-1824.

J. Liu, et al., "Mild and cost-effective synthesis of iron fluoride—graphene nanocomposites for high-rate Li-ion battery cathodes," J. Mater. Chem. A 1 (2013) 1969-1975.

X. Zhao, et al., "Photothermal-assisted fabrication of iron fluoride—graphene composite paper cathodes for high-energy lithium-ion batteries," Chem. Commun. 48 (2012) 9909-9911.

Q. Chu, et al. "Reduced graphene oxide decorated with FeF3 nanoparticles: Facile synthesis and application as a high capacity cathode material for rechargeable lithium batteries," Electrochim. Acta. 111 (2013) 80.

F. Karlicky, et al. "Halogenated Graphenes: Rapidly Growing Family of Graphene Derivatives" ACS Nano, 2013, 7 (8), pp. 6434-6464.

U.S. Appl. No. 15/412,852 Final Office Action dated Apr. 9, 2020, 10 pages.

U.S. Appl. No. 15/412,852 Final Office Action dated Jun. 11, 2019, 9 pages.

U.S. Appl. No. 15/412,852 Nonfinal Office Action dated Jan. 2, 2019, 7 pages.

U.S. Appl. No. 15/412,852 Nonfinal Office Action dated Nov. 13, 2019, 9 pages.

U.S. Appl. No. 15/416,850 Nonfinal Office Action dated May 24, 2019, 17 pages.

\* cited by examiner

EXFOLIATED GRAPHITE WORM-PROTECTED METAL FLUORIDE AND METAL CHLORIDE CATHODE ACTIVE MATERIALS FOR LITHIUM BATTERIES

FIELD OF THE INVENTION

The present invention relates generally to the field of rechargeable lithium battery and, more particularly, to a cathode layer containing a new group of graphite worm-protected cathode active materials (metal fluoride and metal chloride) or metal fluoride and metal chloride hosted by graphite having expanded inter-graphene spaces and the processes for producing this cathode layer.

BACKGROUND OF THE INVENTION

Historically, today's most favorite rechargeable energy storage devices—lithium-ion batteries—actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density<<1 kW/kg), and necessity to use pre-lithiated cathodes (e.g. lithium cobalt oxide, as opposed to cobalt oxide), thereby limiting the choice of available cathode materials. Further, these commonly used cathode active materials have a relatively low specific capacity (typically <220 mAh/g). These factors have contributed to the two major shortcomings of today's Li-ion batteries—a low energy density (typically 150-220 Wh/$kg_{cell}$) and low power density (typically <0.5 kW/kg).

Although several high-capacity anode active materials have been found (e.g., Si with a theoretical capacity of 4,200 mAh/g), there has been no corresponding high-capacity cathode material available. To sum it up, battery scientists have been frustrated with the low energy density of lithium-ion cells for over three decades! Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The production of these cathode active materials normally has to go through a high-temperature sintering procedure for a long duration of time, a tedious, energy-intensive, and difficult-to-control process.

(3) The insertion and extraction of lithium in and out of these commonly used cathodes rely upon extremely slow solid-state diffusion of Li in solid particles having very low diffusion coefficients (typically $10^{-8}$ to $10^{-14}$ cm$^2$/s), leading to a very low power density (another long-standing problem of today's lithium-ion batteries).

(4) Current cathode active materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

(5) The most commonly used cathodes, including lithium transition metal oxides, contain a high oxygen content that could assist in accelerating the thermal runaway and provide oxygen for electrolyte oxidation, increasing the danger of explosion or fire hazard. This is a serious problem that has hampered the widespread implementation of electric vehicles.

Thus, there is a strong and urgent need to develop high-capacity cathode active materials. Metal fluorides with metallic cations in high oxidation states and a strong ionic character of the M-F bonds (M=a metal) have been proposed as alternative cathode active materials due to their high theoretical energy densities. For instance, $FeF_3$ has attracted considerable interests because of its low cost and low toxicity. However, the highly ionic character induces a large band gap, thus metal fluorides have very poor electronic conductivity. In addition, LiF, the product of the conversion reaction, is also highly insulating. Accordingly, metal fluoride electrodes often suffer severely from slow reaction kinetics and low lithium storage capacity, significantly lower than the theoretical capacity.

Several attempts have been made to overcome these issues, but with very limited success. For instance, an effort was made to enhance the electrochemical activity by reducing the metal fluoride particle size to the nanometer range for the purpose of achieving shorter electron-conducting paths and larger reaction surface. In this example, Badway, et al. reported a $FeF_3$/C nanocomposite through ball-milling [F. Badway, et al., "Carbon metal fluoride nanocomposites high-capacity reversible metal fluoride conversion materials as rechargeable positive electrodes for Li batteries," J. Electrochem. Soc. 150 (2003) A1318-A1327]. However, this method has several drawbacks, including difficulties in controlling materials properties and production of a significant number of defects.

The deposition of $FeF_3$ on conductive carbon particle surfaces without ball milling was proposed as another means of improving electrode performance. For instance, Kim et al. have fabricated carbon nanotube/$FeF_3$ composites by nucleation of $FeF_3$ on the defects of CNT surfaces generated by HF etching [S. W. Kim, et al., "Fabrication of $FeF_3$ nanoflowers on CNT branches and their application to high power lithium rechargeable batteries," Adv. Mater. 22 (2010) 5260-5264]. This strategy has been followed by others to fabricate $FeF_3$ on activated carbon micro bead [L. Liu, et al., "Synthesis and electrochemical performance of spherical $FeF_3$/ACMB composite as cathode material for lithium-ion batteries," J. Mater. Sci. 47 (2012) 1819-1824]. Liu et al. proposed a low-temperature in situ approach for the synthesis of uniform FeF$_3$ nano particles on reduced graphene oxide (rGO) sheets suspended in ethanol solution [J. Liu, et al., "Mild and cost-effective synthesis of iron fluoride-graphene nanocomposites for high-rate Li-ion battery cathodes," J. Mater. Chem. A 1 (2013) 1969-1975]. However, the loading level of FeF$_3$ on rGO and the rate capability of the FeF$_3$/graphene composites remain too low for practical applications.

Other attempts to use graphene as a conductive additive for FeF$_3$ all fall short in providing good rate capability, high energy density, and long cycle life. Examples of these earlier efforts are [X. Zhao, et al., "Photothermal-assisted fabrication of iron fluoride-graphene composite paper cathodes for high-energy lithium-ion batteries," Chem. Commun. 48 (2012) 9909-9911] and [Q. Chu, et al. "Reduced graphene oxide decorated with FeF$_3$ nanoparticles:

Facile synthesis and application as a high capacity cathode material for rechargeable lithium batteries," Electrochim. Acta. 111 (2013) 80]. Although Q. Chu, et al. claim to achieve a high specific capacity of 476 mAh/g, this capacity is achieved only when the current density is at a practically useless value of 50 mA/g (an excessively low discharge rate). Further, the specific capacity rapidly drops to approximately 110 mAh/g after only 50 charge-discharge cycles (see FIG. 5B of Chu, et al.). Furthermore, this maximum achievable value of 476 mAh/g is significantly lower than the theoretical specific capacity of 712 mAh/g for FeF$_3$, indicating a low active material utilization rate (i.e. a significant proportion of the active material is not fully utilized).

Due to extremely poor electrical conductivity of all cathode active materials in a lithium-ion or lithium metal cell, a conductive additive (e.g. carbon black, fine graphite particles, expanded graphite particles, or their combinations), typically in the amount of 5%-15%, must be added into the electrode. However, the conductive additive is not an electrode active material. The use of a non-active material means that the relative proportion of an electrode active material is reduced or diluted. For instance, the incorporation of 5% by weight of PVDF as a binder and 5% of carbon black as a conductive additive in a cathode would mean that the maximum amount of the cathode active material (e.g., lithium cobalt oxide) is only 90%, effectively reducing the total lithium ion storage capacity. Since the specific capacities of the more commonly used cathode active materials are already very low (140-220 mAh/g), this problem is further aggravated if a significant amount of non-active materials is used to dilute the concentration of the active material.

Carbon black (CB) materials, as a conductive additive, have several drawbacks: (1) CBs are typically available in the form of aggregates of multiple primary particles that are typically spherical in shape. Due to this geometric feature (largest dimension-to-smallest dimension ratio or aspect ratio ~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths. (2) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for an effective supporting material for metal fluorides and chlorides that enables a high cathode active material utilization rate, high specific capacity at both high and low charge/discharge rates (not just at a low rate), high rate capability, long cycle-life, and improved heat dissipation generated during a battery operation. These are the main objectives of the instant invention.

This supporting or "enabling" material also must be electrically conductive. Preferably, this electrically conductive supporting material is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

It is an object of the present invention to provide a cathode layer that exhibits a combination of exceptional thermal conductivity, electrical conductivity, mechanical strength, and elastic modulus unmatched by any cathode layer commonly used in a lithium-ion battery or lithium metal battery.

SUMMARY OF THE INVENTION

The invention provides a cathode or positive electrode layer for a lithium battery. The invented cathode layer comprises multiple particles or coating of a cathode active material and a layer of exfoliated graphite worms composed of interconnected graphite flakes and inter-flake pores having a pore size from 1 nm to 100 µm, wherein (a) the exfoliated graphite worms contain a worm-like accordion structure selected from exfoliated natural graphite, exfoliated artificial graphite, exfoliated meso carbon micro-beads (MCMBs), exfoliated coke, exfoliated meso-phase pitch, exfoliated carbon or graphite fiber, or a combination thereof; (b) the cathode active material particles or coating is selected from a metal fluoride or metal chloride, has a size from 0.4 nm to 10 µm, and is in an amount from 1% to 99% by weight based on the total weight of the exfoliated graphite worms and the cathode active material combined; and (c) some of the inter-flake pores are lodged with the particles or coating of the cathode active material.

The layer of exfoliated graphite worms, when measured without the cathode active material, preferably has a density from 0.01 to 1.7 g/cm$^3$, a specific surface area from 5 to 1,000 m$^2$/g, a thermal conductivity of at least 10 W/mK, or an electrical conductivity no less than 100 S/cm.

The invention includes a high-capacity cathode layer and a significantly improved cathode layer production process that provides not only a robust 3-D network of electron-conducting paths and high conductivity, but also enables the cathode material to be readily made into an electrode layer with a high electrode tap density, a sufficiently large electrode thickness (typically 50-600 µm to ensure a sufficient amount of output current), a large weight percentage of cathode active material (with respect to the total amount of the non-active materials, such as conductive additive and binder, in an electrode and a separate current collector combined), a high energy, high power density (high % of conversion reaction completion even at high charge-discharge rates), and long-term cycling stability. The reversible capacity is also significantly improved over those of state-of-the-art cathode materials.

Briefly, the present invention provides a new cathode layer composition wherein a cathode active material (e.g. transition metal fluoride or chloride particles) is naturally lodged in pores of a layer of compressed graphite worms that is beyond just having an adequate room to accommodate expansion of the cathode active material. The presently invented graphite worm-based electrode structure also exhibits a unique "elastic" property in that the pore walls (solid portion of the porous graphite worm structure) can be compressed to tightly embrace cathode active material particles when a cathode layer is made. When individual particles expand (upon Li intercalation) during a battery discharge operation, the volume expansion is accommodated by local cell walls, without inducing a volume change of the entire cathode layer (hence, not exerting internal pressure to the battery). During the subsequent charge cycle, these particles shrink; yet the local pore walls (interconnected graphite flakes) shrink or snap back in a congruent manner, maintaining a good contact between cell walls and the particles (remaining capable of accepting $Li^+$ ions and electrons during the battery next discharge cycle).

The cathode active material that is lodged in pores of this cathode layer is a metal fluoride or metal chloride selected from the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, or a combination thereof. The particles or coating of the cathode active material preferably has a diameter or thickness less than 10 μm, more preferably less than 1 μm, further more preferably less than 100 nm, still more preferably less than 10 nm, and most preferably less than 5 nm. The particles or coating can be as small as 0.4 nm. The cathode active material is in an amount from 1% to 99% of the total cathode layer weight; preferably and more typically from 50% to 99% by weight.

Preferably, the cathode active material particles are in a form of nano particle, nano wire, nano fiber, nano tube, nano sheet, nano belt, nano ribbon, or nano coating having a thickness or diameter less than 100 nm, more preferably less than 10 nm, and most preferably less than 5 nm.

In certain embodiments, exfoliated graphite worms contain a non-carbon element selected from oxygen, fluorine, chlorine, bromine, iodine, nitrogen, hydrogen, or boron.

In a preferred embodiment, the cathode layer further comprises an additional carbon or graphite material therein, wherein the carbon or graphite material is in electronic contact with or deposited onto the cathode active material. Most preferably, this carbon or graphite material embraces the particles of the cathode active material and the embraced particles are then lodged in the pores of the graphite worms. The carbon or graphite material may be selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Most preferably, the cathode layer further comprises a conductive protective coating, selected from a carbon material, electronically conductive polymer, conductive metal oxide, conductive metal coating, or a lithium-conducting material, which is deposited onto or wrapped around the nano particle, nano wire, nano fiber, nano tube, nano sheet, nano belt, nano ribbon, or nano coating. The coating can be a lithium-conducting material.

In certain embodiments, the compressed exfoliated graphite worms have a density from 0.5 to 1.7 g/cm³ or the inter-flake pores have a pore size from 2 nm to 100 nm. In certain embodiments, the exfoliated graphite worms have a specific surface area from 10 to 200 m²/g or a density from 0.1 to 1.5 g/cm³, when measured without the presence of a cathode active material.

The invention also provides a unique cathode or positive electrode layer for a lithium battery, wherein the cathode layer comprises: (a) a layer of graphite or carbon material having expanded inter-graphene planar spaces with an inter-plane spacing $d_{002}$ from 0.43 nm to 2.0 nm as measured by X-ray diffraction (original graphite or carbon material typically has an inter-planar spacing from 0.27 to 0.42 nm); and (b) a cathode active material residing in the inter-graphene planar spaces, wherein the cathode active material is selected from a metal fluoride or metal chloride (typically having a size from 0.3 nm to 2.0 nm) and is in an amount from 1% to 95% by weight based on the total weight of the graphite or carbon material and the cathode active material combined.

In this cathode layer, the graphite or carbon material is selected from an oxidized, fluorinated, nitrogenated, or intercalated version of natural graphite, artificial graphite, meso carbon micro-bead (MCMB), coke, meso-phase pitch, carbon or graphite fiber, or multi-walled carbon nanotube, wherein the graphite or carbon material has an original inter-planar spacing $d_{002}$ in the range of 0.27 nm to 0.42 nm that has been expanded to a spacing from 0.43 nm to 2.0 nm due to an oxidation, fluorination, nitrogenation, or intercalation treatment of the original graphite or carbon material. Thus, the graphite or carbon material having an expanded inter-planar spacing can contain a non-carbon element selected from oxygen, fluorine, chlorine, bromine, iodine, nitrogen, hydrogen, or boron.

The invention also provides a process for producing a cathode layer featuring a graphite or carbon material containing an expanded inter-planar space. The process comprises intercalating a metal fluoride or metal chloride into expanded inter-graphene planar spaces of the graphite or carbon material using a procedure of ion-exchange intercalation, redox intercalation reaction, hydrogen bonding-assisted intercalation, electrochemical reaction, or a combination thereof. Alternatively, the process may comprise intercalating a precursor to the metal fluoride or metal chloride into the expanded inter-graphene planar spaces of the layer of graphite or carbon material and then converting the precursor to the metal fluoride or metal chloride inside said expanded spaces.

In a preferred embodiment, the cathode layer is made from a layer that is a continuous-length roll sheet form having a thickness from 1 μm to 10 cm and a length of at least 2 meters and is produced by a roll-to-roll process. In another preferred embodiment, the cathode is in a continuous-length filamentary form having a thickness or diameter from 1 μm to 10 cm and a length of at least 2 meters.

The present invention also provides a lithium battery containing the cathode or positive electrode as defined above, an anode or negative electrode, and an electrolyte in ionic contact with the anode and the cathode. This lithium battery can further contain a cathode current collector in electronic contact with the cathode. In an embodiment, the lithium battery further contains an anode current collector in electronic contact with the anode.

Alternatively and more preferably, in the lithium battery, the layer of compressed graphite worms operates as a cathode current collector to collect electrons from the cathode active material during a discharge operation of the lithium battery, which contains no separate or additional cathode current collector. The lithium battery can be a lithium-ion battery or lithium metal battery.

The anode may contain lithium metal (e.g. Li metal foil) as the anode active material in a lithium metal secondary battery. The anode may contain a pre-lithiated material (e.g. pre-lithiated graphite, pre-lithiated carbon, and pre-lithiated Si particles, etc.) as an anode active material in a lithium-ion cell.

Thus, the anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Preferably, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

In a preferred embodiment, the solid graphite worm-protected cathode active material is made into a continuous-length roll sheet form (a roll of a continuous sheet of compressed graphite worms) having a thickness from 1 μm to 10 cm and a length of at least 1 meter long, preferably at least 2 meters, further preferably at least 10 meters, and most preferably at least 100 meters. This sheet roll is produced by a roll-to-roll process. It has not been previously found or suggested possible to have a roll-to-roll process for producing a continuous length of graphite worm-based cathode structure. Alternatively, the cathode layer can be in a continuous-length filamentary form having a thickness or diameter from 1 μm to 10 cm and a length of at least 2 meters.

The invention also provides a process for producing the graphite worm-based cathode layer described above. The process comprises: (a) mixing metal fluoride or metal chloride particles in a graphite worm-liquid suspension to form a multiple-component slurry; (b) dispensing the slurry into a wet layer using a casting, extruding, coating, or spraying procedure; and (c) compressing and drying the wet layer into a dried and consolidated layer, wherein the metal fluoride or chloride particles naturally reside in pores of the consolidated graphite worms.

Alternatively, the process for producing the cathode layer comprises: (a) impregnating metal fluoride or chloride particles or coating into pores of a layer of graphite worms to form a pre-impregnated graphite worm layer; and (b) compressing and consolidating the pre-impregnated graphite worm layer into a cathode layer, wherein the metal fluoride or chloride particles or coating naturally reside in pores of the graphite worm layer.

In another embodiment, the process for producing the cathode layer comprises: (a) impregnating a precursor to metal fluoride or chloride into pores of a layer of graphite worms; and (b) chemically or thermally converting the precursor into particles or coating of metal fluoride or chloride, which resides in pores of the graphite worms or bonded to pore-wall surfaces of interconnected graphite flakes in the graphite worms.

DESCRIPTION OF THE PREFERRED EMBODIMENTS

Figure 1A:
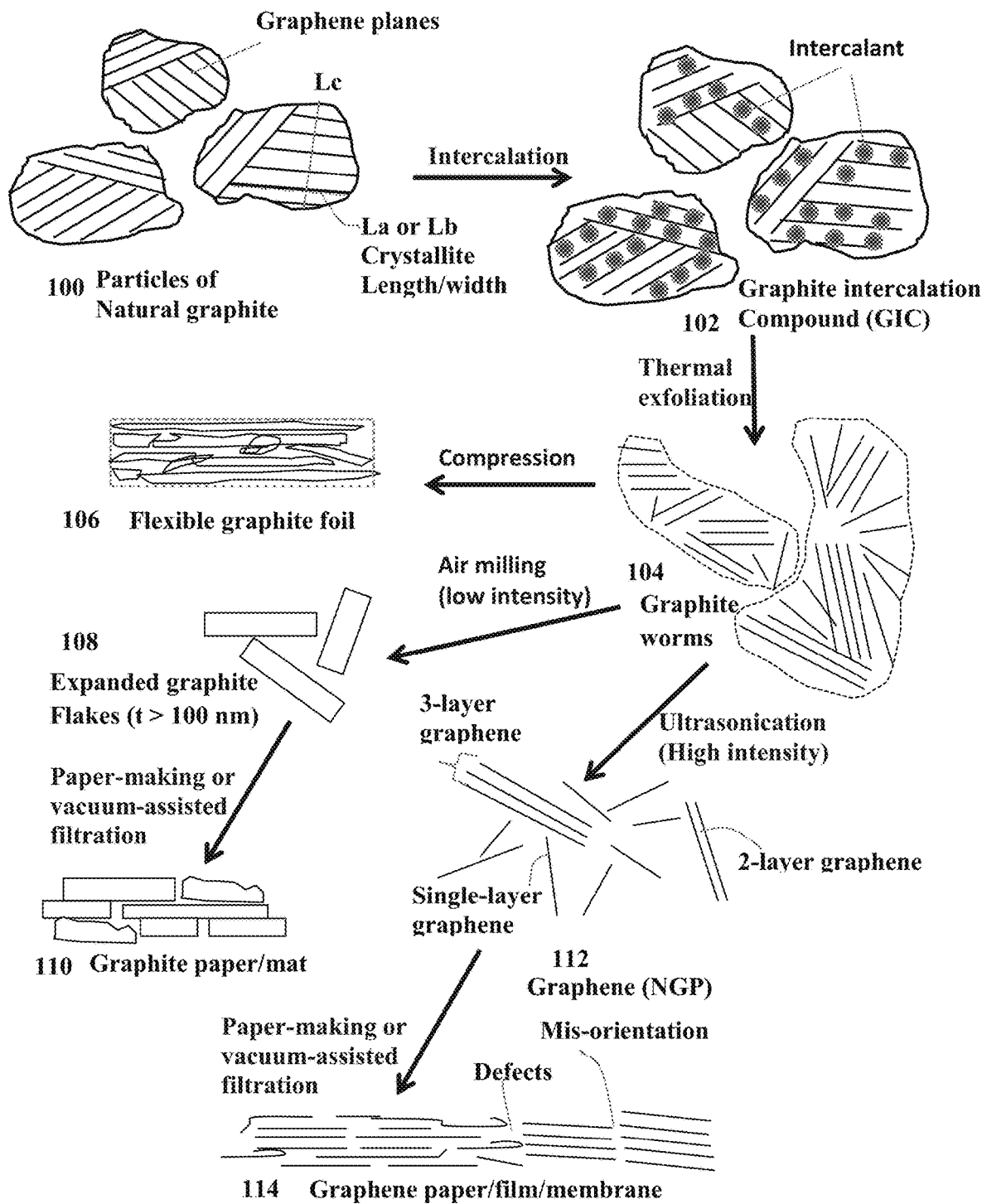
FIG. 1(A) Schematic drawing illustrating the processes for producing conventional paper, mat, film, and membrane of simply aggregated graphite or graphene flakes/platelets. All processes begin with intercalation and/or oxidation treatment of graphitic materials (e.g. natural graphite particles)

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range of 0.32-0.35 nm and do not strongly depend on the synthesis method.

The spacing between constituent graphene planes of a graphite crystallite in a natural or artificial graphite particle can be expanded (i.e. the $d_{002}$ spacing being increased from the original 0.27-0.42 nm to the range of 0.42-2.0 nm) or even exfoliated (having an inter-flake spacing from 2.0 nm to 200 µm). In exfoliated graphite, individual graphite flakes (each containing 1 to several hundred of graphene planes stacked together) are highly spaced from one another, having a spacing of typically 2.0 nm-200 µm, but remain physically interconnected, forming an accordion or worm-like structure (e.g. FIG. 1(B) and FIG. 1(C)).

More specifically, due to the van der Waals forces holding the parallel graphene planes together being weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and intercalation of graphite. This is schematically illustrated in FIG. 1(D). The presence of an intercalant, oxygen-containing group, or fluorine-containing group serves to increase the spacing between two graphene planes in a graphite crystallite.

In one process, graphite materials having an inter-planar spacing and subsequently exfoliated graphite worms are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.42-2.0 nm, more typically in the range of 0.5-1.2 nm. It may be noted than the "expandable graphite" is not "expanded graphite" (to be further explained later).

Figure 1B:
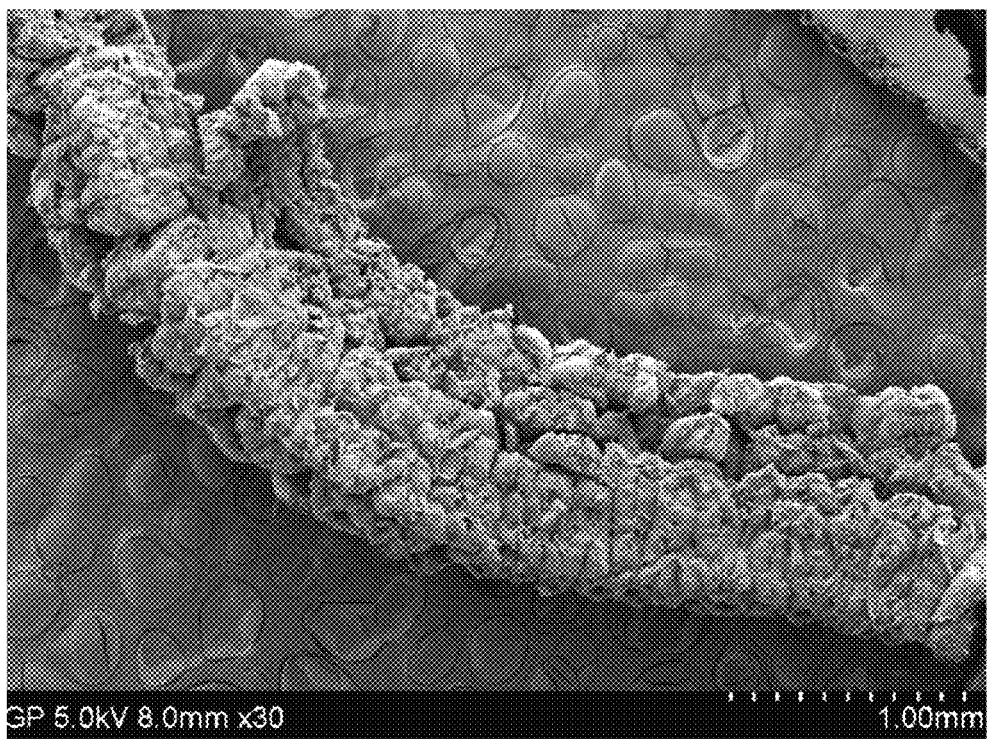
FIG. 1(B) An SEM image of graphite worms.
Figure 1C:
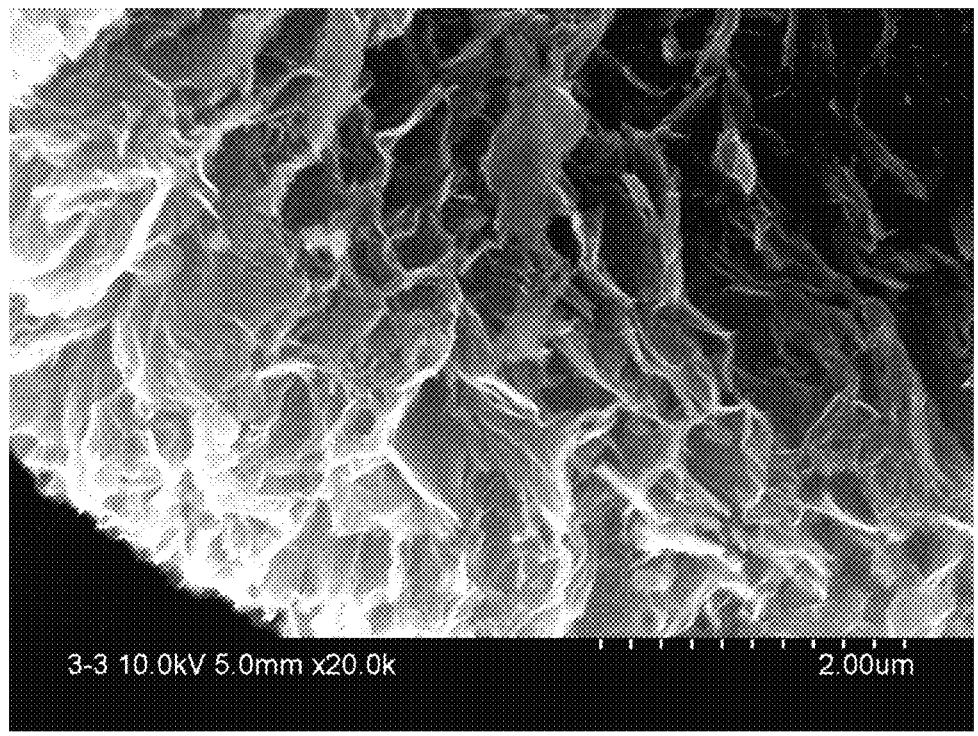
FIG. 1(C) Another SEM image of graphite worms.
Figure 1D:
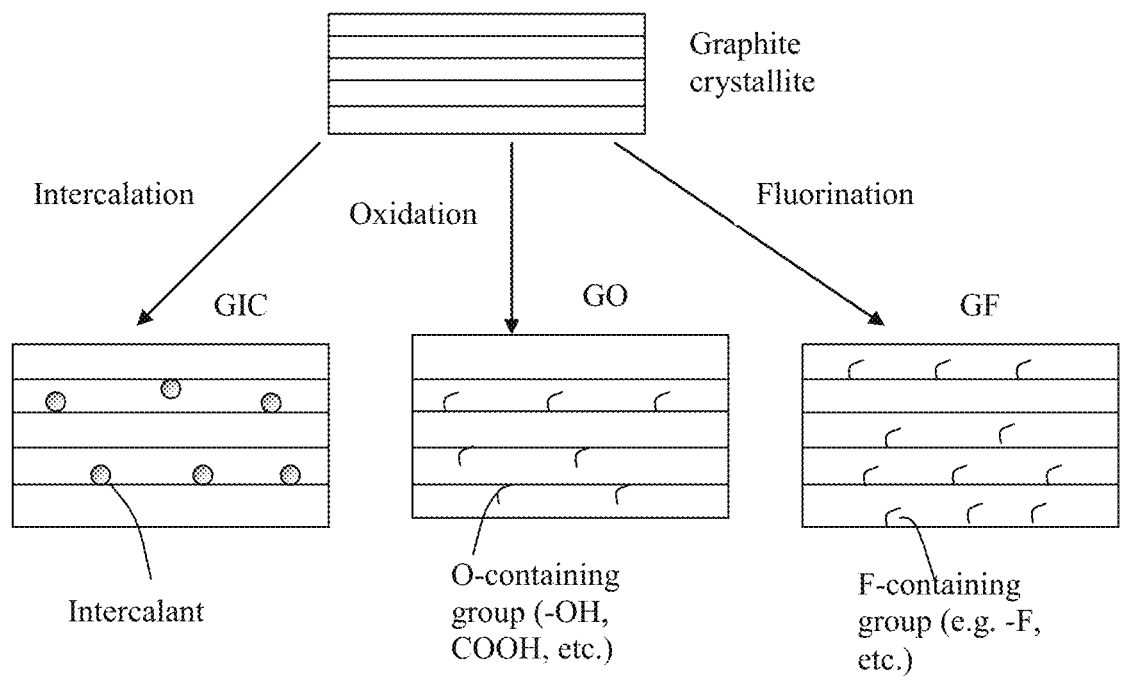
FIG. 1(D) Schematic drawing illustrating the approaches of producing graphite structures containing expended inter-planar spaces.

Upon exposure of expandable graphite to a temperature in the range of typically 800-1,050° C. for approximately 30 seconds to 2 minutes, the GIC undergoes a rapid volume expansion by a factor of 30-300 to form "exfoliated graphite" or "graphite worms" (104), which are each a collection of exfoliated, but largely un-separated graphite flakes that remain interconnected, FIG. 1(B) and FIG. 1(C).

These graphite worms (exfoliated graphite or "networks of interconnected/non-separated graphite flakes") contain pores having a size from 2 nm to 200 µm that can accommodate a cathode active material, such as $FeF_3$ and $CuCl_2$.

In graphite industry, graphite worms can be re-compressed to obtain flexible graphite sheets or foils (106) that typically have a thickness in the range of 0.1 mm (100 µm)–0.5 mm (500 µm). In the instant invention, a cathode active material or its precursor is incorporated into pores of a mass of graphite worms before this mass is re-compressed to form a cathode layer of a desired porosity level or physical density.

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expandable graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our US Application US20050271574. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

Further alternatively, the graphite oxide suspension may be subjected to ultrasonication for the purpose of separating/isolating individual graphene oxide sheets from graphite oxide particles. This is based on the notion that the inter-graphene plane separation has been increased from 0.3354 nm in natural graphite to 0.5-1.2 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

It may be noted that the "expandable graphite" or graphite with expanded inter-planar spacing may also be obtained by forming graphite fluoride (GF), instead of GO. Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

The presence of N, O, F, H, or other chemical species (e.g. Na, Li, K, Ce, Ca, Fe, $NH_4$, etc.) between graphene planes serves to expand the inter-planar spacing, creating room to accommodate electrochemically active materials therein. The expanded interstitial spaces between graphene planes (hexagonal carbon planes or basal planes) are found by us in this study to be surprisingly capable of accommodating metal fluoride or metal chloride species that have a size from 0.3 nm to 2.0 nm. This can be accomplished by intercalating graphite with such chemical species as Na, Li, K, Ce, Ca, $NH_4$, or their combinations, which are then chemically or electrochemically ion-exchanged with metal elements (Bi, Fe, Co, Mn, Ni, Cu, etc.) or directly ion-exchanged with metal fluoride/chloride species. The graphite material containing these interstitial metal elements is then subjected to fluorination or chlorination treatment to produce metal fluoride or metal chloride residing in inter-planar spaces. Several metal fluoride or metal chloride may also be directly intercalated into interstitial spaces between graphene planes. In general, intercalation of metal fluoride or chloride into interstitial spaces can be accomplished by ion-exchange intercalation, redox intercalation reaction, hydrogen bonding-assisted intercalation, or electrochemical reaction. The graphite material having metal fluoride or chloride residing in its expanded interstitial spaces makes a highly cycle-stable cathode material for a lithium battery.

Figure 3A:
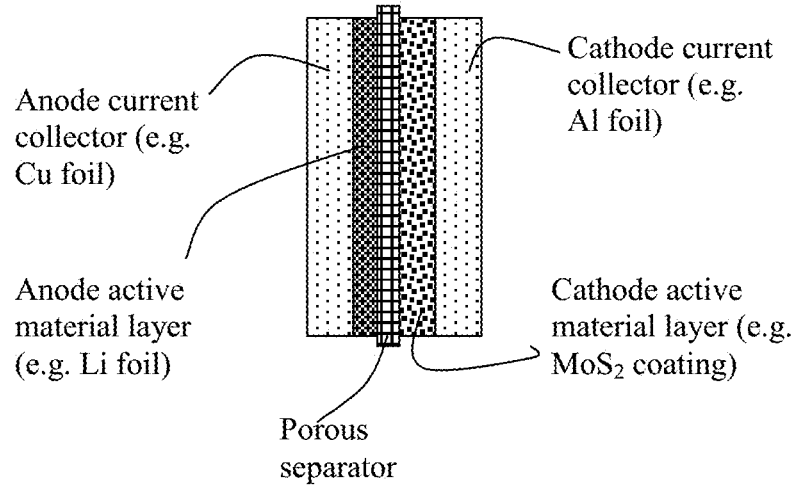
FIG. 3(A) Schematic of a prior art lithium battery cell, wherein the anode layer is a thin Li coating or lithium foil.
Figure 3B:
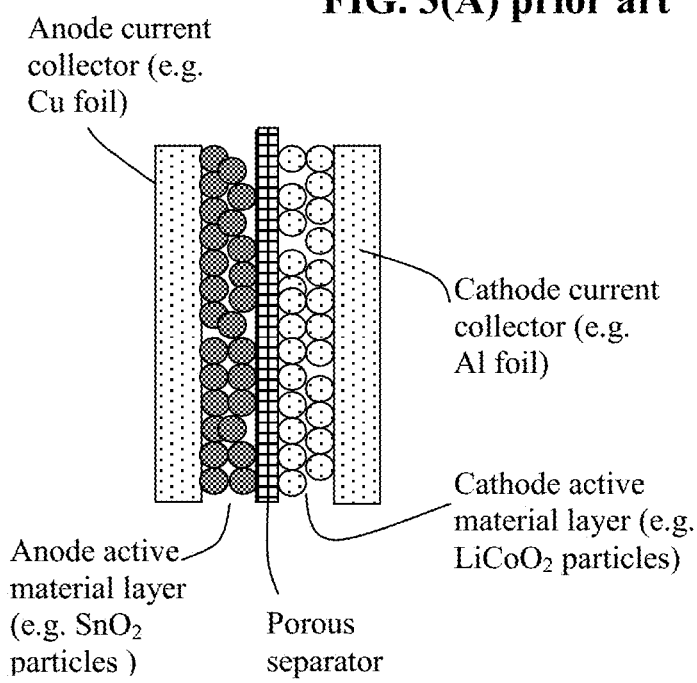
FIG. 3(B) schematic of a prior art lithium-ion battery; the anode layer being composed of particles of an anode active material, a conductive additive (not shown) and a resin binder (not shown).

The configuration of a lithium battery is now discussed as follows:

As illustrated in FIG. 3(B), a unit cell or building block of a conventional lithium-ion battery is typically composed of an anode current collector (e.g. Cu foil), an anode or negative electrode layer (containing an anode active material responsible for storing lithium therein, a conductive additive, and a resin binder), an electrolyte and optional porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte. For a conventional lithium metal secondary battery (FIG. 3(A)), the anode layer is simply a lithium foil attached to an anode current collector (e.g. Cu foil).

The binder in the conventional cathode layer is used to bond the cathode active material (e.g. $LiCoO_2$ and $LiMn_2O_4$ particles) and a conductive filler (e.g. carbon black or carbon nanotube) together to form a cathode layer of structural integrity, and to bond the cathode layer to a separate cathode current collector, which acts to collect electrons from the cathode active material when the battery is charged. In other words, in the positive electrode side of the battery, there are typically four different materials involved: a cathode active material, a conductive additive, a resin binder (e.g. polyvinylidine fluoride, PVDF, and polytetrafluoroethylene, PTFE), and a cathode current collector (typically a sheet of Al foil). However, only the cathode active material participates in the storage of lithium ions; the other 3 materials are all non-active materials that unnecessarily add extra weight and volume to the cathode that is already of low lithium storage capacity. The present invention minimizes the use of non-active materials.

This invention is directed at the cathode layer (positive electrode layer) containing a high-capacity cathode material (metal fluoride or metal chloride) for the lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration.

In conventional lithium-ion batteries now widely used in various industries (e.g. portable devices, such as smart phones, and EVs), the operation of cathode active materials (e.g. $LiCoO_2$, $LiMn_2O_4$, $LiFePO_4$, etc.) is all based on the lithium intercalation mechanism. However, lithium intercalation alone does not provide adequate lithium storage capability. The instant invention is directed at cathode active materials that work on conversion reaction-based lithium storage mechanisms, in place of or in addition to the intercalation mechanism. In conversion reactions, the transition-metal, M, of an initial $MX_y$ species (X=F or Cl) is reduced by lithium to give LiX and the pure metal, M. The involved materials could greatly enhance the lithium storage capability of the cathode and, hence, the energy density of Li-ion cells. The reason for such high energy densities lies in the possibility for the transition metal to pass through various oxidation states involving more than one electron. For example, $FeF_3$ could potentially reach 712 mAh/g if the 3-electron reactions are allowed to be completed. In contrast, in $LiFePO_4$, only the Fe(III)/Fe(II) couple will be active, delivering a theoretical maximum of only 170 mAh/g (4.2 times less than that of iron trifluoride).

Unfortunately, due to various technical reasons (e.g. extremely low electrical conductivity, poor contact between active material and conductive filler, large active material particle size, poor active material utilization rate, significant volume changes during lithiation/delithiation, etc.), the maximum lithium storage capacities of all transition metal fluoride or chloride materials have not been fully realized. Actually, what has been achieved thus far typically has fallen short of the theoretical capacity by a factor of 2-5. The present invention has overcome these highly challenging problems and enabled all the transition metal fluoride or chloride materials to more fully realize their lithium storage capability.

Further, the conventional cathode layer is typically 10-300 μm thick (more typically 100-200 μm) to give rise to a desired amount of current per unit electrode area. This thickness range is an industry-accepted constraint under which a battery designer must work. This constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <<100 μm) does not contain a sufficient amount of an active lithium storage material (hence, insufficient current output); and (c)

all non-active material layers in a battery cell (e.g. current collectors, conductive additive, binder resin, and separator) must be kept to a minimum in order to obtain a minimum overhead weight and a maximum lithium storage capability and, hence, a maximized energy density (Wk/kg or Wh/L of cell).

In other words, there are several conflicting factors that must be considered concurrently when it comes to the design and selection of a cathode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the exfoliated graphite worm-protected cathode active material.

Figure 2:
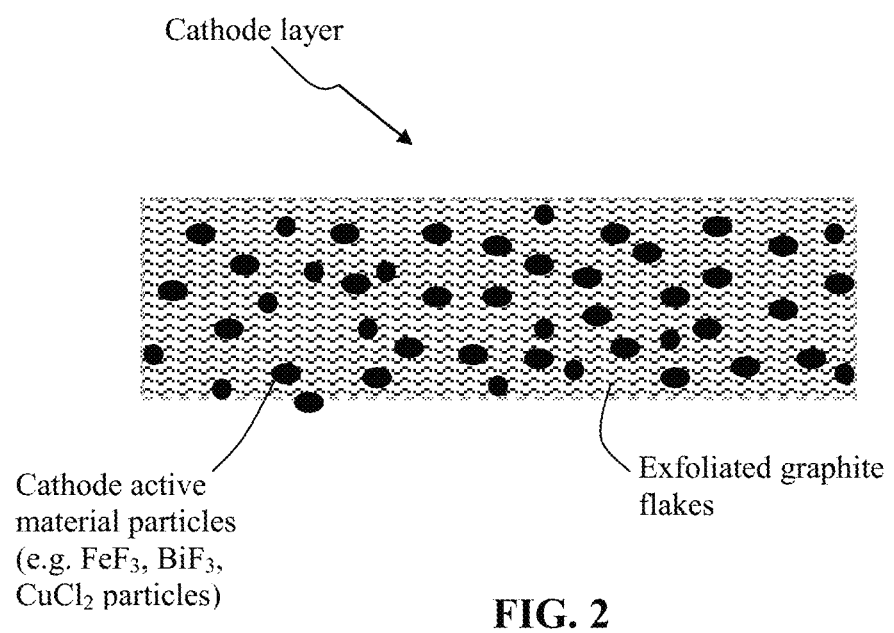
FIG. 2 Schematic of a layer of recompressed graphite worms containing metal fluoride or chloride nano particles or coating embedded in pores of the graphite worms.

As schematically illustrated in FIG. 2, the present invention provides a cathode layer containing (A) a sheet of solid graphite worms composed of multiple pores between interconnected graphite flakes and (B) a cathode active material with the particles of this cathode active material residing in some of these pores; preferably some pores remaining unoccupied, acting to cushion volume expansion of the cathode active material particles. The invention also provides a process for producing such a cathode layer.

More specifically, the invented cathode or positive electrode layer comprises a cathode active material embedded in pores of a layer of graphite worms that are compressed. The cathode layer is composed of multiple pores between exfoliated flakes that remain interconnected, wherein (a) graphite worms are selected from exfoliated natural graphite, exfoliated artificial graphite, exfoliated meso carbon microbeads (MCMBs), exfoliated coke, exfoliated meso-phase pitch, exfoliated carbon or graphite fiber, or a combination thereof; (b) the cathode active material is in an amount from 0.5% to 99% by weight (preferably from 5% to 95% by weight and more preferably from 50% to 95% by weight) based on the total weight of the graphite worms and the cathode active material combined; and (c) some pores are lodged with the particles of the cathode active material. Preferably, other pores are particle-free, and the graphite worms are sufficiently elastic to accommodate volume expansion and shrinkage of the particles of the cathode active material during battery charge-discharge cycles to avoid expansion of the cathode layer.

The layer of solid graphite worms typically has a density from 0.01 to 1.7 g/cm$^3$ (more typically from 0.05 to 1.6 g/cm$^3$, further more typically from 0.1 to 1.5 g/cm$^3$, and more desirably from 0.5 to 1.3 g/cm$^3$), a specific surface area from 5 to 1,000 m$^2$/g, a thermal conductivity of at least 100 W/mK, and/or an electrical conductivity no less than 100 S/cm. It may be noted that these ranges of physical densities are not arbitrarily selected ranges. On the one hand, these densities are designed so that the internal pore amount (level of porosity) is sufficiently large to accommodate the maximum expansion of a cathode active material, which varies from one cathode active material to another. On the other hand, the pore amount cannot be too large (or physical density being too low); otherwise, the graphite worm layer would not be sufficiently strong and elastic (or, not capable of undergoing a large deformation that is fully recoverable or reversible).

Ideally, the pores should expand to the same extent as the embraced cathode active material particle does; and should shrink back to the same extent as the cathode active material particle. In other words, the layer of interconnected graphite flakes must be fully elastic to meet such a requirement.

Much to our surprise, these requirements are met with the instant cathode layer even though graphite worms per se are presumably relatively weak and fragile.

Presumably, transition metal fluoride or chloride powders, such as $CoF_3$, $MnF_3$, $FeF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, and $MnCl_2$ are all commercially available and the powder could be impregnated into pores of the graphite worm. However, these particles are typically very large in size (typically >10 μm in diameter) and cannot be easily and uniformly added into the pores. Also, these particles cannot be naturally bonded to graphene surfaces. As such, the resulting metal fluoride/worm or metal chloride/worm composites, when used as a cathode active material, do not exhibit satisfactory electrochemical performances. In particular, they often fall short in cycle stability, rate capability, specific capacity, active material utilization efficiency, and energy density.

In order to overcome these challenges, we have developed new compositions, structures, and processes that enable the production of high-performance cathode active materials based on graphite worm-protected transition metal fluoride or chloride. The transition metal fluoride or chloride inside the pores of a graphite worm layer is preferably and typically in a nano particle or nano coating form that is bonded to surfaces of graphite flakes (pore walls).

Three approaches may be followed to produce graphite worm-protected metal fluoride or chloride particles:

1) The first approach includes (a) mixing and stirring pre-made metal fluoride or chloride particles (5 nm-10 μm in size) in a graphite worm-liquid suspension to form a multiple-component slurry; (b) dispensing the slurry into a wet layer (using a casting, extruding, coating, spraying procedure, etc.); and (c) compressing and drying the wet layer into a dried and consolidated layer, wherein the pre-made metal fluoride or chloride particles naturally reside in pores of the recompressed graphite worms.

2) The second approach entails (a) impregnating either pre-made metal fluoride or chloride particles or coating into the pores of a layer of graphite worms (e.g. via melt impregnation, vapor phase infiltration, or sputtering) to form a pre-impregnated graphite worm layer and (b) compressing and consolidating the pre-impregnated graphite worm layer into a cathode layer, wherein the pre-made metal fluoride or chloride particles naturally reside in pores of the recompressed graphite worm layer.

3) The third approach involves (a) impregnating a precursor to metal fluoride or chloride into pores of a layer of graphite worms and (b) chemically or thermally converting the precursor into particles or coating of metal fluoride or chloride, which resides in pores of the graphite worms and is typically bonded to pore-wall surfaces of interconnected graphite flakes.

Several methods can be used to synthesize metal fluoride or chloride nanocrystals that are deposited on and bonded to pore-wall graphite flake surfaces in a graphite worm layer. The synthesis method typically involves mixing two reactants in a solution pre-impregnated into pores of graphite worms and activating the reactions between the two reactants to form metal fluoride species in the solution phase inside these pores. The graphite flake-based pore walls are surprisingly capable of bonding well to the transition metal fluoride or chloride nanocrystals that are nucleated from graphite flake surfaces. Using $FeF_3$ as an example of metal fluoride, three main methods involving three different chemical routes are herein described. The same methods can be used to produce neat metal fluoride or chloride nano crystals without the presence of graphene.

The first method entails precipitating $FeF_3$ nanoparticles from solution reactants of $Fe(NO_3)_3$ ethanol solution and $NH_4HF_2$ aqueous solution in the pores of graphite worms. Prior to impregnation into pores, the solution is subjected to thorough stirring, with or without the assistance of polyethylene glycol (PEG, MW=20,000 g/mole), as a surfactant. The reaction products are $FeF_3$ nanocrystals bonded to pore-wall graphite flake surfaces. By removing the liquid component from the resulting suspension one obtains the graphite worm-protected FeF3 material.

The second method of synthesizing the $FeF_3$ nanoparticles entails mixing a solution of $Fe(NO_3)_3$ hexanol+$H_2O$ with a solution of $NH_4F$ hexanol+$H_2O$ together+cetyltrimethyl ammonium bromide (CTAB) as a surfactant. The reactant solution may be stirred for 1 hour and then impregnated into the pores of graphite worms. After another hour, one obtains $FeF_3$ nanocrystals chemically bonded to the graphite flakes that constitute the pore walls of graphite worms.

The third synthetic route is based on a liquid-solid-solution phase-transfer reaction commonly used in the preparation of rare-earth fluoride nanocrystals. A typical procedure includes mixing and stirring octadecylamine, linoleate acid, and ethanol together to form a homogeneous solution and then adding aqueous $Fe(NO_3)_3$ solution and $NH_4HF_2$ solution sequentially or concurrently into the mixed organic solution. This reaction mixture may be stirred for about 10 min and then transferred to an autoclave, sealed, and hydrothermally treated at 120° C. for about 6 h. The products are suspensions containing FeF3 nanocrystals. These suspensions can then be impregnated into pores of graphite worms. Alternatively, graphite worms and the reactant solution may be mixed together prior to being added into the autoclave for the hydrothermal treatment. The final product is a graphite worm structure naturally containing $FeF_3$ lodged in the pores.

The transition metal fluoride or chloride species can be in a nano sphere, nano-wire, nano-sheet, nano-belt, nano platelet, nano disc, or nano-tube form. For instance, the $FeF_3$ nanowires (NWs) can be prepared by a solution synthesis of α-iron fluoride trihydrate (α-$FeF_3.3H_2O$) NWs, followed by thermal dehydration of the α-$FeF_3.3H_2O$ NWs. The solution growth of α-$FeF_3.3H_2O$ NWs can be conducted under a low supersaturation condition without the use of surfactants.

The present invention also provides a lithium battery containing the cathode or positive electrode as defined above, an anode or negative electrode, and an electrolyte in ionic contact with the anode and the cathode. This lithium battery can further contain a cathode current collector in electronic contact with the cathode. In an embodiment, the lithium battery further contains an anode current collector in electronic contact with the anode.

Alternatively and more preferably, in the lithium battery, the layer of compressed graphite worms operates as a cathode current collector to collect electrons from the cathode active material during a discharge operation of the lithium battery, which contains no separate or additional cathode current collector. This feature helps to reduce the weight and volume of the battery. The lithium battery can be a lithium-ion battery or lithium metal battery.

The anode may contain lithium metal (e.g. Li metal foil) as the anode active material in a lithium metal secondary battery. The anode may contain a pre-lithiated material (e.g. pre-lithiated graphite, pre-lithiated carbon, and pre-lithiated Si particles, etc.) as an anode active material in a lithium-ion cell.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Preferably, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

In a preferred embodiment, the graphite worm-protected cathode active material is made into a continuous-length roll sheet form (a roll of a continuous sheet of compressed graphite worms) having a thickness from 1 μm to 10 cm and a length of at least 1 meter long, preferably at least 2 meters, further preferably at least 10 meters, and most preferably at least 100 meters. This sheet roll is produced by a roll-to-roll process. It has not been previously found or suggested possible to have a roll-to-roll process for producing a continuous length of graphite worm-based cathode structure. Alternatively, the cathode layer can be in a continuous-length filamentary form having a thickness or diameter from 1 μm to 10 cm and a length of at least 2 meters. The filaments may be made by, for instance, extruding a liquid suspension mixture of graphite worms and embedded cathode active material particles through one or a plurality of orifices onto a solid substrate and then removing the liquid component. This can be conducted in a continuous and automated manner.

The following examples are used to illustrate some specific details about the best modes of practicing the instant invention and should not be construed as limiting the scope of the invention.

Example 1: Graphite Having Expanded Inter-Planar Spaces Containing Metal Fluoride or Chloride Therein (Gas-Phase Intercalation)

$FeCl_3$— and $CoCl_2$-intercalated natural graphite samples were produced by both the liquid phase intercalation and aqueous solution intercalation methods.

Gas phase intercalation of graphite by $FeCl_3$ and $CoCl_2$ was carried out in a well-known "two bulb" tube having two heating zones for the graphite and the reactant, respectively. This intercalation reaction was conducted under a chlorine atmosphere. The processing parameters were as follows: For $FeCl_3$ intercalation, the graphite zone temperature was 310° C., halide zone 295° C., chlorine pressure=1.5 atm, and reaction time was 50 hours. For $CoCl_2$ intercalation, the graphite zone temperature was 590° C., halide zone 580° C., chlorine pressure=12 atm, and reaction time was 11 days. With a sufficient amount of intercalant, the intercalated graphite compound contained up to 65% by weight of $FeCl_3$ and 47% by weight of $CoCl_2$, respectively.

By exposing the FeCl$_3$— and CoCl$_2$-intercalated graphite compounds to a fluorine treatment, one obtains FeF$_3$— and CoF$_2$-intercalated graphite compounds, presumably according to the following two reactions, respectively: FeCl$_3$+3 HF→FeF$_3$+3 HCl, and CoCl$_2$+2 HF→CoF$_2$+2 HCl.

Example 2: Graphite Having Expanded Inter-Planar Spaces Containing Metal Fluoride or Chloride Therein (Electrochemical Intercalation in the Liquid Solution Phase)

Particles of both natural graphite and artificial graphite were also electrochemically intercalated by metal chloride or fluoride in the liquid solution. Particles of approximately 20-30 µm in size were compressed to form a disc 2.54 cm in diameter and 1 mm in thickness, which served as the working electrode. A platinum plate was used as the counter electrode. Anhydrous ferric chloride was dissolved in distilled water as the electrolyte. An electrolyte in the amount of 200 mL was used in each electrochemical reactor. One (1) M KCl/saturated AgCl electrode (Ag/AgCl) was employed as the reference electrode. The electrochemical reactions were conducted using an electrochemical workstation that was capable of voltage sweeping and current adjusting. The voltage was swept from 1.0 V to 1.8 V vs. standard hydrogen electrode (SHE) with an interval of 0.1 V. Alternatively, the current density was varied from 0.3 to 2.5 mA/cm$^2$. The reaction time was from 2 hours to 24 hours.

Example 3: Preparation of GO or GIC, and Graphite Having Metal Chloride or Fluoride Residing in Expanded Inter-Planar Spaces Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. The slurry was then dried at 100° C. overnight to obtain a graphite intercalation compound (GIC), which was also graphite oxide having expanded inter-planar spacing ($d_{002}$=0.75 nm-1.3 nm).

It may be noted that, in Example 1, the graphite samples having expanded inter-planar spaces and metal fluoride or metal chloride residing in these spaces were obtained from original graphite without a previous oxidation or intercalation treatment. The inter-planar spacing was expanded due to the introduction of FeCl$_3$ and CoCl$_2$ species into these spaces. In the instant Example 3, the sulfuric acid and nitric acid that were intercalated into natural graphite samples were gradually removed by repeatedly immersing and washing the GIC samples in water and then dried. The resulting powder was basically graphite oxide having expanded spacing of $d_{002}$=0.65 nm-1.2 nm. The same electrochemical intercalation procedure employed in Example 2 was conducted on the graphite oxide sample to intercalate FeCl$_3$ and CoCl$_2$ species into the already expanded spaces. We have surprisingly observed that the inter-planar spacing, previously expanded, was further expanded to $d_{002}$=0.9 nm-1.8 nm, capable of accommodating more FeCl$_3$ and CoCl$_2$ species (up to 78% and 61%, respectively). This implies that one could have a higher proportion of the cathode active material and when the graphite material having FeCl$_3$ and CoCl$_2$ species residing in further expanded interstitial spaces is implemented as a cathode layer the resulting lithium battery would deliver a higher battery energy density.

Furthermore, the graphite host makes a highly conducting 3D network of electron-conducting pathways. The notion that the FeCl$_3$ and CoCl$_2$ species and their ion-exchanged versions (FeF$_3$ and CoF$_2$) are typically in a size range of 0.5 nm to 2.0 nm implies that the conversion reaction of these cathode active materials with lithium can be very fast and relatively complete, resulting in an exceptionally high rate capability (high power density and high energy density under high charge/discharge rates).

Example 4: Preparation of Exfoliated Graphite (Graphite Worms) from GIC or Graphite Oxide Some of the GIC or graphite oxide samples prepared in Example 3 were subjected to thermal exfoliation at a temperature in the range of 800-1,050° C. to obtain graphite worms.

Commercially available powders of CoF$_3$, MnF$_3$, FeF$_3$, VF$_3$, VOF$_3$, TiF$_3$, and BiF$_3$ were subjected to high-intensity ball-milling to reduce the particle size down to approximately 0.5-2.3 µm. Each type of these metal fluoride particles was then added into a graphite worm-liquid suspension to form a multiple-component slurry. The slurry was cast into a wet layer onto a surface of a stainless steel sheet, which was followed by liquid removal to form a dried layer. The dried layer was then compressed into a consolidated layer, wherein the metal fluoride particles naturally reside in pores of the recompressed graphite worms.

A layer of graphite worms slightly compressed was made using a custom-made mold in such a manner that the pores of graphite worms remain largely open and readily accessible to metal fluoride/chloride species or their precursors. This step was followed by impregnating a precursor to metal fluoride/chloride into pores of a layer of graphite worms.

For instance (using FeF$_3$ as an example), the hydrated FeF$_3$ (formula FeF$_3$.3H$_2$O) was dissolved in distilled water at a concentration of 45 g in 100 mL water. The resulting solution was impregnated into pores of a layer of slightly compressed graphite worms having an oxygen content of 2.5%-35% (implying that the graphite flakes remaining largely graphite oxide flakes). The water content was gradually removed at 60-85° C., allowing nano particles or nano coating of FeF$_3$.3H$_2$O to get precipitated and nucleated from graphite flake surfaces. The resulting hybrid material was then subjected to a reduction treatment at 750-950° C. that converted FeF$_3$.3H$_2$O to FeF$_3$ and, concurrently, helped to thermally reduce graphite oxide worms to graphite worms. The particles or coating of FeF$_3$ resides in pores of the graphite worms and is typically bonded to pore-wall surfaces of interconnected graphite flakes. Graphite worms containing other types of metal fluoride or chloride could be prepared in a similar manner.

Example 5: Preparation of Exfoliated Graphite (Graphite Worms) from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The resulting oxidized MCMB particles were then thermally exfoliated at 800° C. to produce graphite worms. The particles or coating of $NiF_2$, $FeF_2$, $CuF_2$, CuF, $SnF_2$, AgF, $CuCl_2$, $FeCl_3$, and $MnCl_2$ was then introduced into pores of the exfoliated graphite worms using a solution impregnation approach.

For instance, since the solubility of $CuCl_2$ in water was known to be 75.7 g/100 mL (25° C.), we dissolved 70 g of $CuCl_2$ in 100 mL of deionized water. The resulting solution was impregnated into pores of a layer of slightly compressed MCMB-derived graphite worms. The water content was gradually removed at 60-85° C., allowing nano particles or nano coating of $CuCl_2$ to precipitate out and get nucleated from graphite flake surfaces. The impregnated graphite worms were then compressed into layers of cathode active materials.

Separately, the $CuCl_2$ in some of the $CuCl_2$-containing exfoliated graphite worms was allowed to react with HF to form $CuF_2$. The impregnated graphite worms were then compressed into layers of cathode active materials. Other types of metal fluoride or chloride-containing graphite worm electrodes were made in a similar manner.

Example 6: Preparation of Graphite Worms from Graphite Fluoride

Several processes have been used by us to produce GF, but only one process is herein described as an example. In a typical procedure, highly exfoliated graphite (HEG) was prepared from intercalated compound $C_2F\cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed. The graphite fluoride has an inter-planar spacing from 0.70 nm to 0.95 nm, which was used to accommodate metal fluoride species using the approaches similar to those discussed in Examples 1 and 3.

Some graphite fluoride samples were thermally exfoliated to obtain graphite fluoride worms, which were used to accommodate metal fluoride or chloride according to the procedures discussed in Examples 4 and 5.

Example 7: Electrochemical Performance of Various Rechargeable Lithium Battery Cells In the present study, lithium metal foil, pre-lithiated Si nano particles, pre-lithiated Sn, pre-lithiated $SnO_2$, and pre-lithiated graphite was used as an anode active material. Commonly used lithium salts (e.g. $LiPF_6$) and solvents (e.g. EC, PC, VC, etc.), with or without a polymer, were employed as the electrolyte. A layer of graphite worm-protected metal fluoride or chloride or a layer of graphite having expanded inter-planar spaces and metal fluoride or chloride hosted therein was used as the cathode layer. Both coin cells and pouch cells were fabricated and tested.

Figure 4:
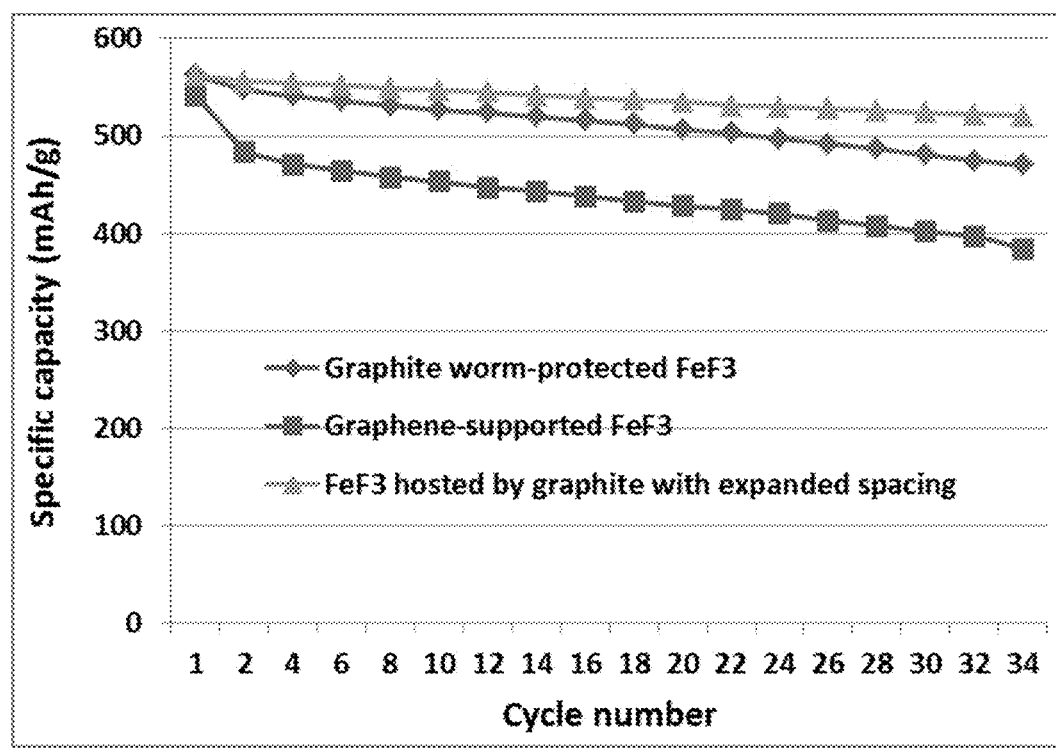
FIG. 4 The specific capacity of a cell containing a cathode layer of $FeF_3$ hosted by graphite with expanded inter-planar spaces, a cell containing a cathode of graphite worm-protected $FeF_3$ and that of a cell containing a cathode of graphene-supported $FeF_3$ nanocrystals, each plotted as a function of the number of charge/discharge cycles.

Quite surprisingly and significantly, as illustrated in FIG. 4, the battery containing a cathode of graphite worm-protected $FeF_3$ particles exhibits a significantly more stable charge/discharge cycling behavior as compared to the battery cell containing a cathode of graphene-supported $FeF_3$ nanocrystals (packed into a sheet of graphene paper). Even more significantly, the layer of $FeF_3$ hosted by graphite having expanded inter-planar spaces provides the most cycling-stable cathode layer. This is truly unexpected and has important implication in lithium battery industry desiring to have a battery having both a high energy density and high cycling stability.

Figure 5:
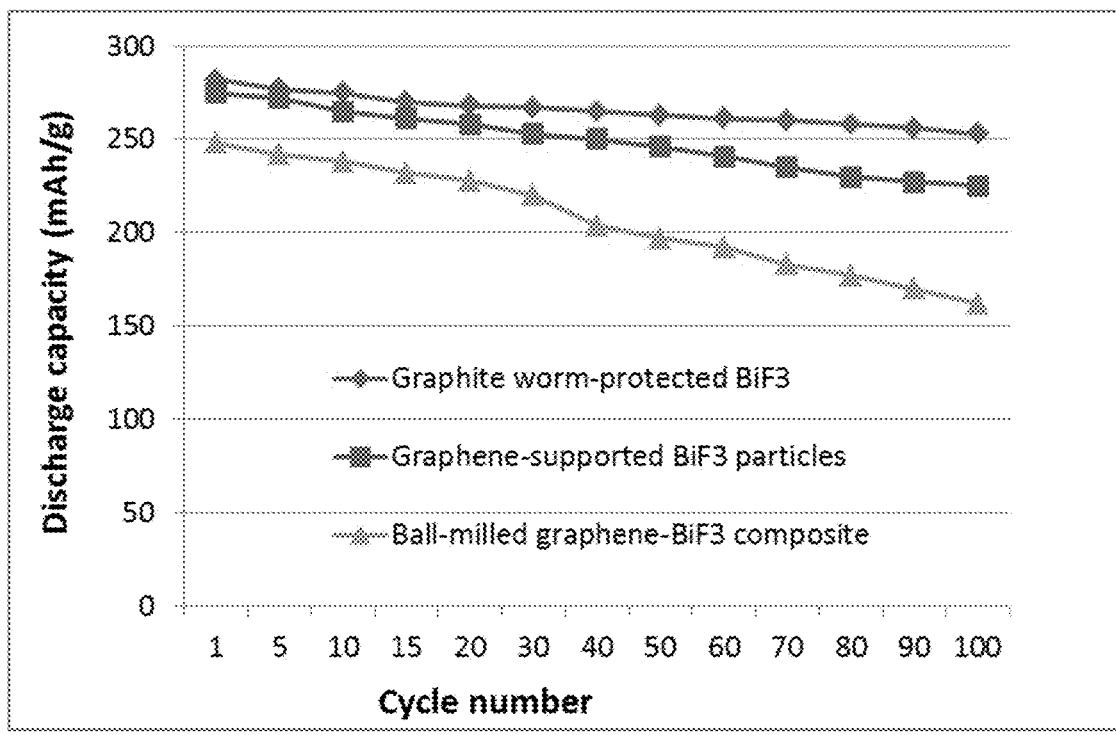
FIG. 5 The specific capacity of a cell containing a cathode of graphite worm-protected $BiF_3$ particles, the specific capacity of a cell containing a cathode of graphene-supported $BiF_3$ nanocrystals, and the specific capacity of a cell containing a cathode of ball-milled $BiF_3$/graphene mixture, each plotted as a function of the number of charge/discharge cycles.

Shown in FIG. 5 are the Ragone plots of three battery cells: a cell containing a cathode of $FeF_3$ nanocrystals hosted by graphite with expanded inert-planar spaces, a cell containing a cathode of graphene-supported $FeF_3$ nanocrystals, and a cell containing a cathode of ball-milled $FeF_3$/graphene mixture. Again, quite unexpectedly and significantly, the cell containing a cathode of $FeF_3$ nanocrystals hosted by graphite with expanded inert-planar spaces delivers the highest energy densities and power densities. The presently invented composition and expanded-$d_{002}$ spacing structure helps to bring out the high lithium storage capacity of the transition metal fluoride at both high and low rate conditions. The high energy density (401 Wh/kg) and high power density (1,674 W/kg) are unprecedented for lithium secondary batteries. The presently invented approach of expanded interstitial spacing protection enables the formation of minute nano-scaled active material crystals (typically 0.4-2 nm in size) that are capable of fast lithium diffusion and full conversion reactions even at very high charge/discharge rates (i.e. maximized utilization of the active material). This high conversion reaction has never been previously thought or found possible with any conversion-based cathode active material.

Figure 6:
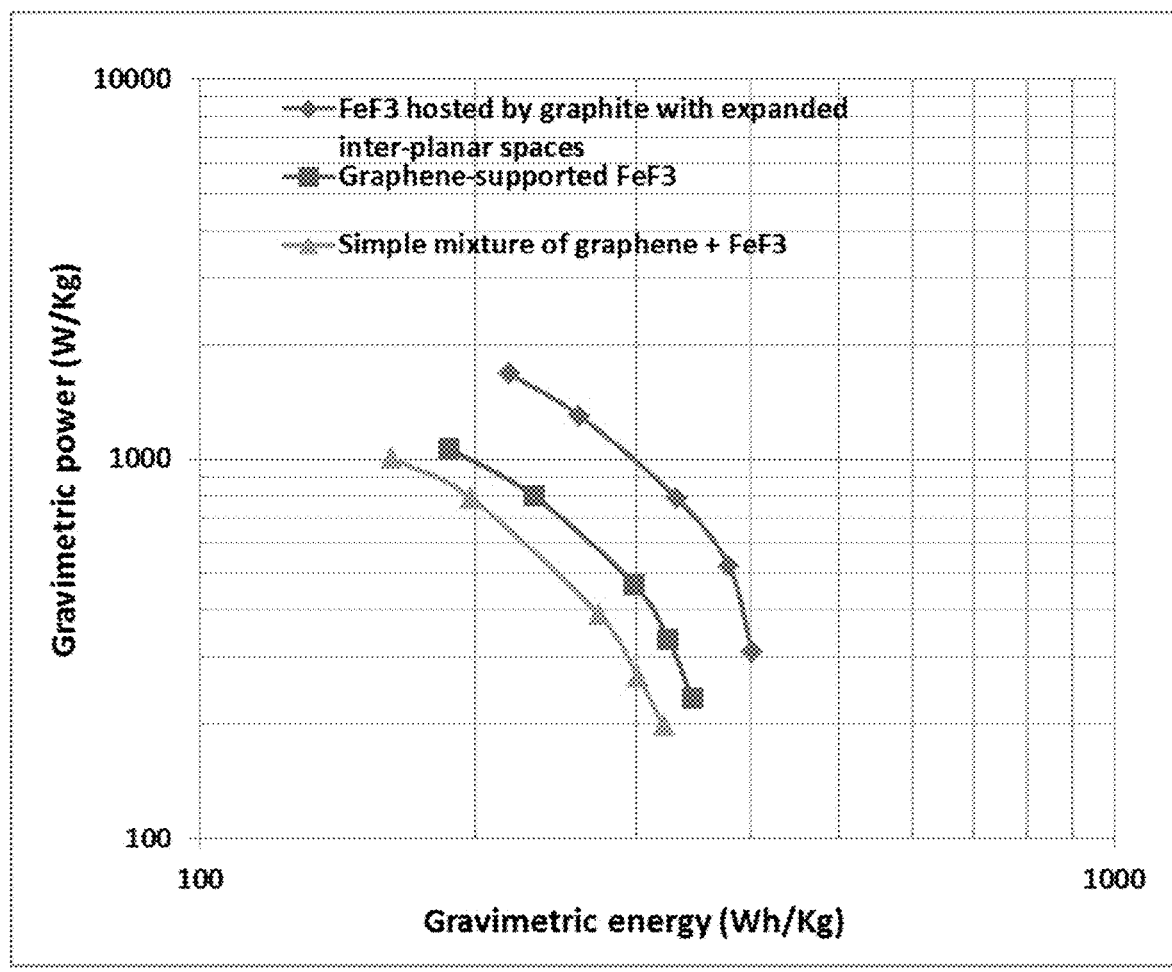
FIG. 6 The Ragone plots of three cells: a cell containing a cathode of graphite worm-protected $FeF_3$ particles, a cell containing a cathode of $FeF_3$ crystals hosted by graphite with expanded inter-planar spaces, and a cell containing a cathode of ball-milled $FeF_3$/graphene mixture.

These unexpected, superior performance characteristics are not limited to $FeF_3$-based cathodes. Other metal fluoride- or metal chloride-based cathodes featuring graphite worm-protected particles or active material hosted by graphite with expanded interstitial spaces also deliver exceptional electro-chemical performances. For instance, as demonstrated in FIG. 6, the cell containing a cathode of graphite worm-protected $BiF_3$ particles exhibits the best charge-discharge cycling stability as compared to the cell containing a cathode of graphene-supported $BiF_3$ nanocrystals and the cell containing a cathode of ball-milled $BiF_3$/graphene mixture. The differences are quite dramatic.

Figure 7:
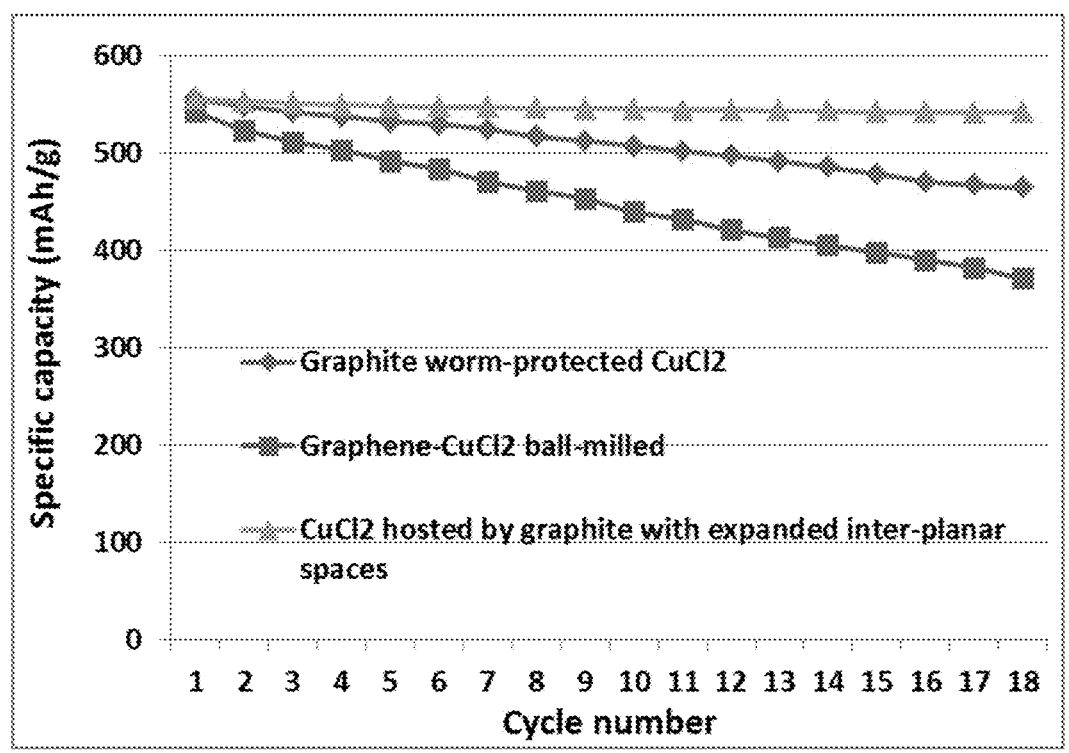
FIG. 7 The specific capacity of a cell containing a cathode of graphite worm-protected $CuCl_2$ particles and that of a cell containing a cathode of graphene-$CuCl_2$ mixture obtained by ball-milling, each plotted as a function of the number of charge/discharge cycles.

Similarly, FIG. 7 shows the specific capacity of a cell containing $CuCl_2$ hosted by graphite having expanded inter-planar spaces, that of a cell containing a cathode of graphite worm-protected $CuCl_2$ particles, and that of a cell containing a cathode of graphene-$CuCl_2$ mixture obtained by ball-milling, each plotted as a function of the number of charge/discharge cycles. These data show the outstanding cycle stability afforded to by the presently invented approaches of implementing expanded graphite worms or graphite with expanded inter-planar spacing to protect metal fluoride or chloride.

In conclusion, we have successfully developed an absolutely new, novel, unexpected, and patently distinct class of highly conducting graphite worm-protected or expanded-$d_{002}$ graphite-protected cathode active materials (metal fluoride or metal chloride) and related processes of production. The chemical composition, structure (crystal perfection, grain size, defect population, etc), crystal orientation, morphology, process of production, and properties of this new class of materials and their protected cathode layers are fundamentally different and patently distinct from those of any prior art cathode active material or cathode layer. The presently invented graphite worms or graphite with expanded d spacing provide better cathode-protecting capability as compared to any prior art materials.

We claim:

1. A cathode or positive electrode layer for a lithium battery, said cathode layer comprising multiple particles or coating of a cathode active material and a layer of exfoliated graphite worms composed of interconnected graphite flakes and inter-flake pores having a pore size from 1 nm to 100 µm, wherein
   a. said exfoliated graphite worms contain a worm-like accordion structure selected from exfoliated meso carbon micro-beads (MCMBs), exfoliated meso-phase pitch, and combinations thereof;
   b. said cathode active material particles or coating is selected from a metal fluoride or metal chloride, has a size from 0.4 nm to 10 µm, and is in an amount from 1% to 99% by weight based on the total weight of said exfoliated graphite worms and said cathode active material combined; and
   c. some of said inter-flake pores are lodged with said cathode active material particles or coating, wherein said cathode layer is in a continuous-length filamentary form having a thickness or diameter from 1 µm to 10 cm.

2. The cathode layer of claim 1, wherein said exfoliated graphite worms, when measured without said cathode active material, have a density from 0.01 to 1.7 g/cm$^3$, a specific surface area from 5 to 1,000 m$^2$/g, a thermal conductivity of at least 10 W/mK, or an electrical conductivity no less than 100 S/cm.

3. The cathode layer of claim 1, wherein said metal fluoride or metal chloride is selected from the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

4. The cathode layer of claim 1, wherein said cathode active material particles or coating has a dimension smaller than 100 nm.

5. The cathode layer of claim 1, wherein said cathode active material particles or coating has a dimension smaller than 10 nm.

6. The cathode layer of claim 1, wherein said cathode active material particles contain transition metal fluoride or chloride particles in a nanowire, nano-tube, nano-disc, nano-ribbon, nano-belt, or nano platelet form having a diameter or thickness smaller than 100 nm.

7. The cathode layer of claim 1, further comprising a carbon or graphite material therein, wherein said carbon or graphite material is in electronic contact with or deposited on said cathode active material.

8. The cathode layer of claim 7, wherein said carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, and combinations thereof.

9. The cathode layer of claim 1, further comprising a conductive protective coating, selected from a carbon material, electronically conductive polymer, conductive metal oxide, conductive metal coating, or a lithium-conducting material, which is deposited onto or wrapped around said cathode active material particles.

10. The cathode layer of claim 1, wherein said exfoliated graphite worms have a density from 0.5 to 1.7 g/cm$^3$ or said inter-flake pores have a pore size from 2 nm to 100 nm.

11. The cathode layer of claim 1, wherein said exfoliated graphite worms have a specific surface area from 10 to 200 m$^2$/g or a density from 0.1 to 1.5 g/cm$^3$, when measured without the presence of a cathode active material.

12. The cathode layer of claim 1, wherein said exfoliated graphite worms contain a non-carbon element selected from oxygen, fluorine, chlorine, bromine, iodine, nitrogen, hydrogen, or boron.

13. The cathode layer of claim 1, which is in a continuous-length roll sheet form having a thickness from 1 µm to 10 cm and a length of at least 2 meters and is produced by a roll-to-roll process.

14. A lithium battery containing the cathode layer as defined in claim 1, an anode or negative electrode, and an electrolyte in ionic contact with said anode and said cathode.

15. The lithium battery of claim 14, further containing an anode current collector in electronic contact with said anode.

16. The lithium battery of claim 14, further containing a cathode current collector in electronic contact with said cathode.

17. The lithium battery of claim 14, wherein said layer of exfoliated graphite worms operates as a cathode current collector to collect electrons from said cathode active material during a discharge of said lithium battery, which contains no separate or additional cathode current collector.

18. The lithium battery of claim 17, which is a lithium-ion battery or lithium metal battery.

19. A process for producing the cathode layer of claim 1, said process comprising:
   (a) mixing metal fluoride or metal chloride particles in a graphite worm-liquid suspension to form a multiple-component slurry;
   (b) dispensing the slurry into a wet layer using a casting, extruding, coating, or spraying procedure; and
   (c) compressing and drying the wet layer into a dried and consolidated layer, wherein the metal fluoride or chloride particles naturally reside in pores of the consolidated graphite worms.

20. A process for producing the cathode layer of claim 1, said process comprising:
   (a) impregnating metal fluoride or chloride particles or coating into pores of a layer of graphite worms to form a pre-impregnated graphite worm layer; and
   (b) compressing and consolidating the pre-impregnated graphite worm layer into a cathode layer, wherein the metal fluoride or chloride particles or coating naturally reside in pores of the graphite worm layer.

21. A process for producing the cathode layer of claim 1, said process comprising:
   (a) impregnating a precursor to metal fluoride or chloride into pores of a layer of graphite worms; and
   (b) chemically or thermally converting the precursor into particles or coating of metal fluoride or chloride, which resides in pores of the graphite worms or bonded to pore-wall surfaces of interconnected graphite flakes in said graphite worms.

22. A cathode or positive electrode layer for a lithium battery, said cathode layer comprising multiple particles or coating of a cathode active material and a layer of exfoliated graphite worms composed of interconnected graphite flakes and inter-flake pores having a pore size from 1 nm to 100 µm, wherein a. said exfoliated graphite worms contain a worm-like accordion structure selected from exfoliated natural graphite, exfoliated artificial graphite, exfoliated meso carbon micro-beads (MCMBs), exfoliated coke, exfoliated meso-phase pitch, exfoliated carbon or graphite fiber, and combinations thereof;
b. said cathode active material particles or coating is selected from a metal fluoride or metal chloride, has a size from 0.4 nm to 10 μm, and is in an amount from 1% to 99% by weight based on the total weight of said exfoliated graphite worms and said cathode active material combined; and
c. some of said inter-flake pores are lodged with said cathode active material particles or coating wherein said cathode layer is in a continuous-length filamentary form having a thickness or diameter from 1 μm to 10 cm and a length of at least 2 meters.

* * * * *